United States Patent [19]
Huang

[11] Patent Number: 6,152,476
[45] Date of Patent: Nov. 28, 2000

[54] FOLDING COLLAPSIBLE BABY STROLLER

[76] Inventor: Tsung-Ming Huang, No. 26, Lane 348, Chu-Lin Rd., Lin-kou Hsiang, Taipei Hsien, Taiwan

[21] Appl. No.: 09/352,934

[22] Filed: Jul. 14, 1999

[51] Int. Cl.[7] ................................ B62B 7/06; B62B 9/08
[52] U.S. Cl. ...................... 280/642; 280/647; 280/47.38; 280/62; 280/650; 188/20; 188/31
[58] Field of Search .................................. 280/642, 644, 280/647, 650, 47.34, 47.371, 47.38, 47.4, 62, 33.994; 188/19, 20, 31, 69

[56] References Cited

U.S. PATENT DOCUMENTS

| | | | |
|---|---|---|---|
| D. 379,951 | 6/1997 | Kirby et al. | D12/133 |
| 3,500,965 | 3/1970 | Nossokoff et al. | 280/33.994 |
| 4,294,464 | 10/1981 | Ettridge | 280/649 |
| 5,090,517 | 2/1992 | Doughty | 188/19 |
| 5,328,000 | 7/1994 | Rutter et al. | 188/1.12 |
| 5,370,408 | 12/1994 | Eagan | 280/33.994 |
| 5,388,853 | 2/1995 | Lauro | 280/642 |
| 5,390,942 | 2/1995 | Schuster et al. | 280/33.994 |
| 5,460,399 | 10/1995 | Baechler et al. | 280/650 |
| 5,478,102 | 12/1995 | Haung | 280/642 |
| 5,524,731 | 6/1996 | Grieg | 188/19 |
| 5,531,295 | 7/1996 | Kopman et al. | 188/21 |
| 5,593,174 | 1/1997 | Graziano et al. | 280/647 |
| 5,735,367 | 4/1998 | Brubaker | 188/19 |
| 5,775,718 | 7/1998 | Huang | 280/642 |
| 5,799,959 | 9/1998 | Krawczyk | 280/47.27 |
| 5,845,924 | 12/1998 | Huang | 280/642 |
| 5,887,889 | 3/1999 | Andrus | 280/647 |
| 5,947,491 | 9/1999 | Meier | 280/47.2 |
| 6,022,042 | 2/2000 | Hartenstine | 280/642 |
| 6,062,587 | 5/2000 | Cabagnero | 280/642 |
| 6,079,522 | 6/2000 | Valdez | 188/24.19 |

*Primary Examiner*—Brian L. Johnson
*Assistant Examiner*—Bridget Avery
*Attorney, Agent, or Firm*—Bacon & Thomas, PLLC

[57] ABSTRACT

A folding collapsible baby stroller, which includes a front wheel frame holding a front wheel, a rear wheel frame holding a pair of rear wheels, a handlebar pivoted to the front wheel frame and the rear wheel frame, a seat frame coupled between the front wheel frame and the rear wheel frame, the seat frame having a U-shaped front bearing frame pivoted to a fixed cross bar at the front wheel frame, a U-shaped rear bearing frame, two slides bilaterally coupled between the rear bearing frame and the front bearing frame, and two connecting rods bilaterally pivotably connected between the rear bearing frame and the rear wheel frame, a front wheel brake for operation by hand to stop the front wheel, and a rear wheel Drake controlled to lock the rear wheels.

7 Claims, 8 Drawing Sheets

FOLDING COLLAPSIBLE BABY STROLLER

BACKGROUND OF THE INVENTION

The present invention relates to baby strollers, and more particularly to a folding collapsible baby stroller, which comprises a hand-operated front wheel brake for stopping the front wheel, and a rear wheel brake for locking the rear wheels.

When carrying a baby outdoors, the baby may be directly carried on a bag hung on the parent's shoulders, or pushed on a baby stroller. A baby stroller can also be used indoors as seat means for a baby. However, because regular baby strollers have no brake means, it is difficult to control the moving speed of a baby stroller, and the baby stroller may overturn when moving down a slope or in an emergency condition. There are known baby strollers equipped with hand-operated, cable-driven brake means for stopping the wheel(s), however this structure of cable-driven brake means wear quickly with use, and the brake shoe must be regularly replaced. Another drawback of this structure of cable-driven brake means is that it cannot lock the wheels of the baby stroller. When stopping the baby stroller, the brake lever must be maintained depressed. If the brake lever is not firmly depressed, the brake shoe cannot be maintained in close contact with the wheel. Further, in order to save storage space, regular baby strollers are made collapsible. According to conventional folding collapsible baby strollers, the seat frame which is connected between the front wheel frame and the rear wheel frame is made foldable, and releasably locked by a foot-operated locking mechanism. Because the foot-operated locking mechanism wears quickly with use, the seat frame may be forced to fold suddenly, causing the baby to be injured.

SUMMARY OF THE INVENTION

The present invention has been accomplished to provide a folding collapsible baby stroller, which eliminates the aforesaid problems. According to one aspect of the present invention, the baby stroller comprises a front wheel frame holding a front wheel, a rear wheel frame holding a pair of rear wheels, a handlebar pivoted to the front wheel frame and the rear wheel frame, a seat frame coupled between the front wheel frame and the rear wheel frame, the seat frame having a U-shaped front bearing frame pivoted to a fixed cross bar at the front wheel frame, a U-shaped rear bearing frame, two slides bilaterally coupled between the rear bearing frame and the front bearing frame, and two connecting rods bilaterally pivotably connected between the rear bearing frame and the rear wheel frame, and a locking device for locking the handlebar in the operative position. When the locking device is unlocked, the baby stroller can easily be collapsed simply by turning down the handlebar. According to another aspect of the present invention, the folding collapsible baby stroller further comprises a front wheel brake for operation by hand to stop the front wheel, and a rear wheel brake for operation by leg to lock the rear wheels.

DETAILED DESCRIPTION OF THE PREFERRED EMBODIMENT

Referring to FIGS. 1, 2, 3A and 6, a folding collapsible baby stroller is shown comprised of a substantially U-shaped handlebar 5, a front wheel frame 1 pivoted to the handlebar 5, a rear wheel frame 2 pivoted to the handlebar 5, and a seat frame 6 connected between the front wheel frame 1 and the rear wheel frame 2. The front wheel frame 1 and the rear wheel frame 2 each comprise two upright rod members 11 or 21. The front wheel frame 1 holds a front wheel 12. The rear wheel frame 2 further comprises a rear axle 221, which holds two rear wheels 22 at its two distal ends. A rear wheel brake 3 is mounted on the rod members 21 of the rear wheel frame 2. Two first coupling frames 51 are respectively and fixedly provided at the two ends of the handlebar 5. Two second coupling frames 53 are respectively and fixedly provided at two upright rod members 11 of the front wheel frame 1 near the top. Two connecting tubes 52 are respectively connected between the first coupling frames 51 at the handlebar 5 and the second coupling frames 53 at the front wheel frame 1. The first coupling frames 51 each have an insertion hole 511. The second coupling frames 53 each have a longitudinal through hole 531 and a longitudinally extended side groove 531'. The connecting tubes 52 each have one end inserted into the insertion hole 511 at one first coupling frame 51 and fixedly secured thereto by fastening elements, and an opposite end pivoted to one end of the longitudinally extended side groove 531' at one second coupling frame 53 and turned with the handlebar 5 in and out of the longitudinally extended side groove 531'. The upright rod members 11 of the front wheel frame 1 are respectively inserted through the longitudinal through hole 531 at each of the second coupling frames 53, and then fixedly secured thereto by fastening elements. Lock means is provided to lock the handlebar 5 and the front wheel frame 1 in the operative position. According to the present preferred embodiment of the present invention, the lock means comprises two locking devices 54 respectively fastened to the upright rod members 11 of the front wheel frame 1 above the second coupling frames 53. The locking devices 54 each comprise a locking plate 541. The locking plate 541 has a positioning groove 542 for receiving the corresponding connecting tube 52. Two lugs 55 are provided at the handlebar 5 to hold a canopy 7. The seat frame 6 comprises a fixed cross bar 62 fixedly connected between the upright rod members 11 of the front wheel frame 1, a substantially U-shaped front bearing frame 61 pivoted to the fixed cross bar 62, a substantially U-shaped rear bearing frame 64, two slides 63 respectively coupled between the two parallel ends of the U-shaped rear bearing frame 64 and the two parallel ends of the U-shaped front bearing frame 61, and two connecting rods 65 coupled between the slides 63 and the upright rod members 21 of the rear wheel frame 2. The slides 63 each have two parallel through holes 631, which receive the parallel ends of the U-shaped front bearing frame 61 and the parallel ends of the U-shaped rear bearing frame 64. The connecting rods 65 each have a first end pivoted to the U-shaped rear bearing frame 64, and a second end pivoted to one upright rod member 21 of the rear wheel frame 2. Further, a seat 8 is mounted on the seat frame 6.

Figure 1:
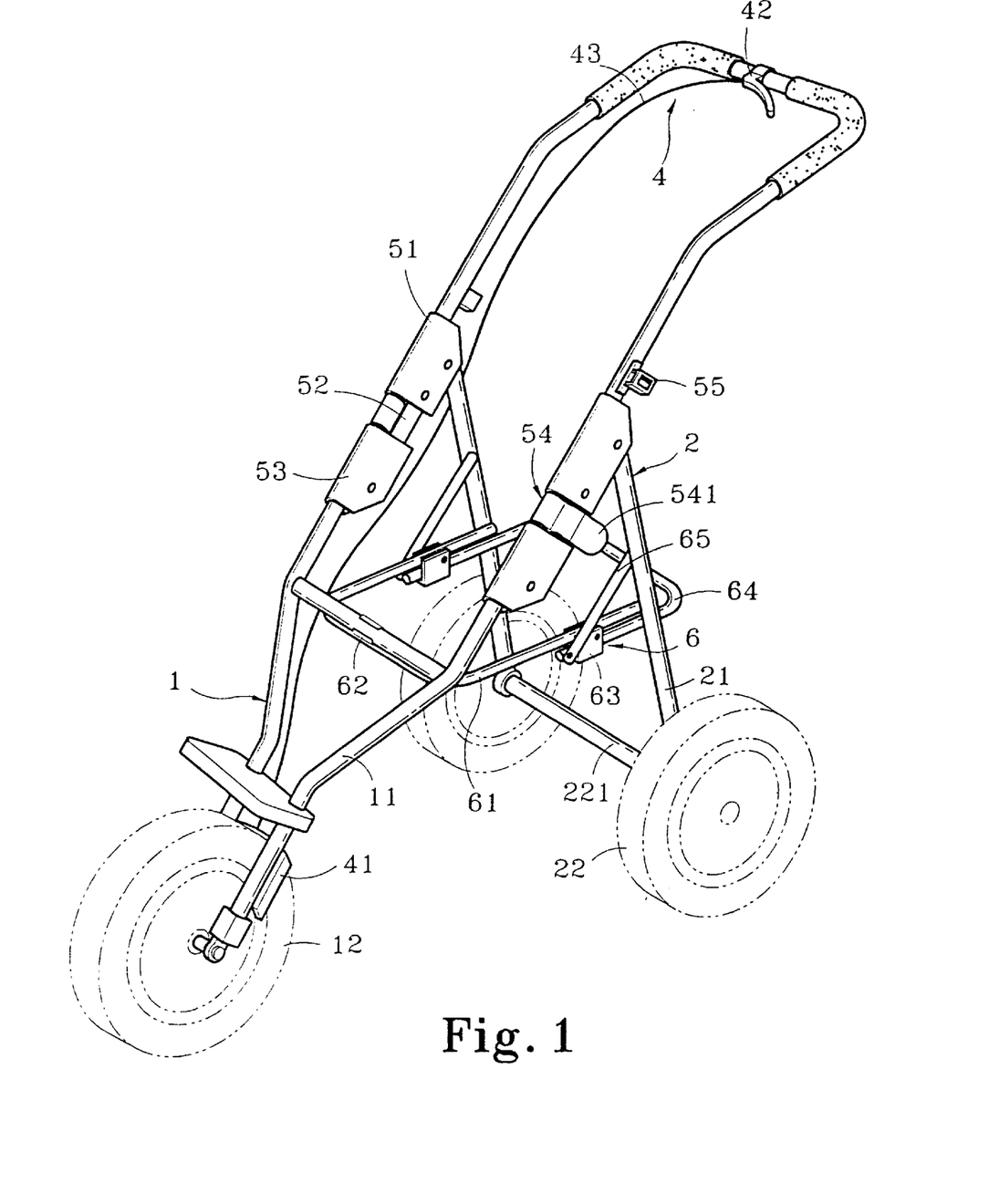
FIG. 1 is a perspective view of a folding collapsible baby stroller according to the present invention.
Figure 2:
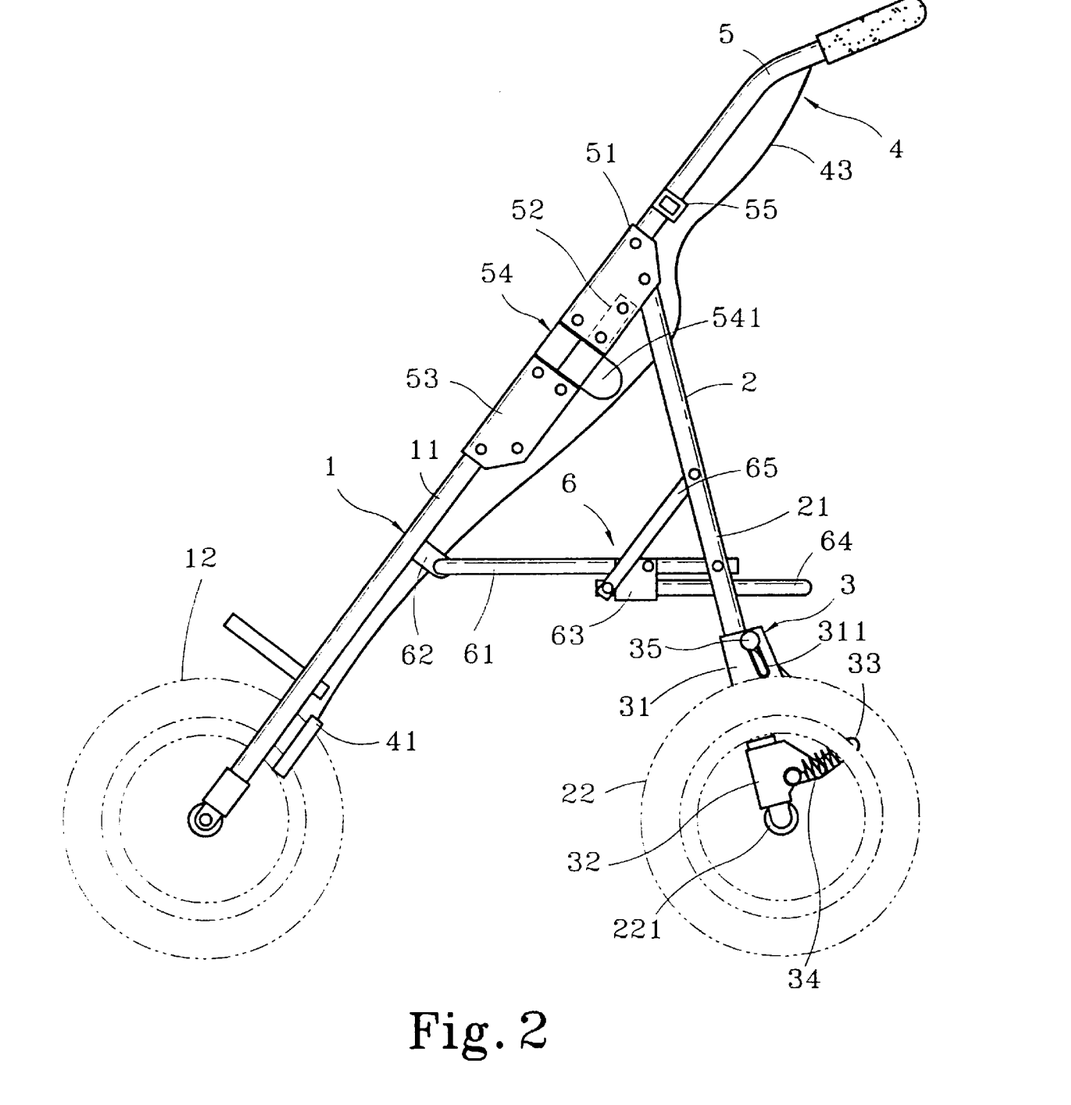
FIG. 2 is a side plain view of the folding collapsible baby stroller shown in FIG. 1.
Figure 3A:
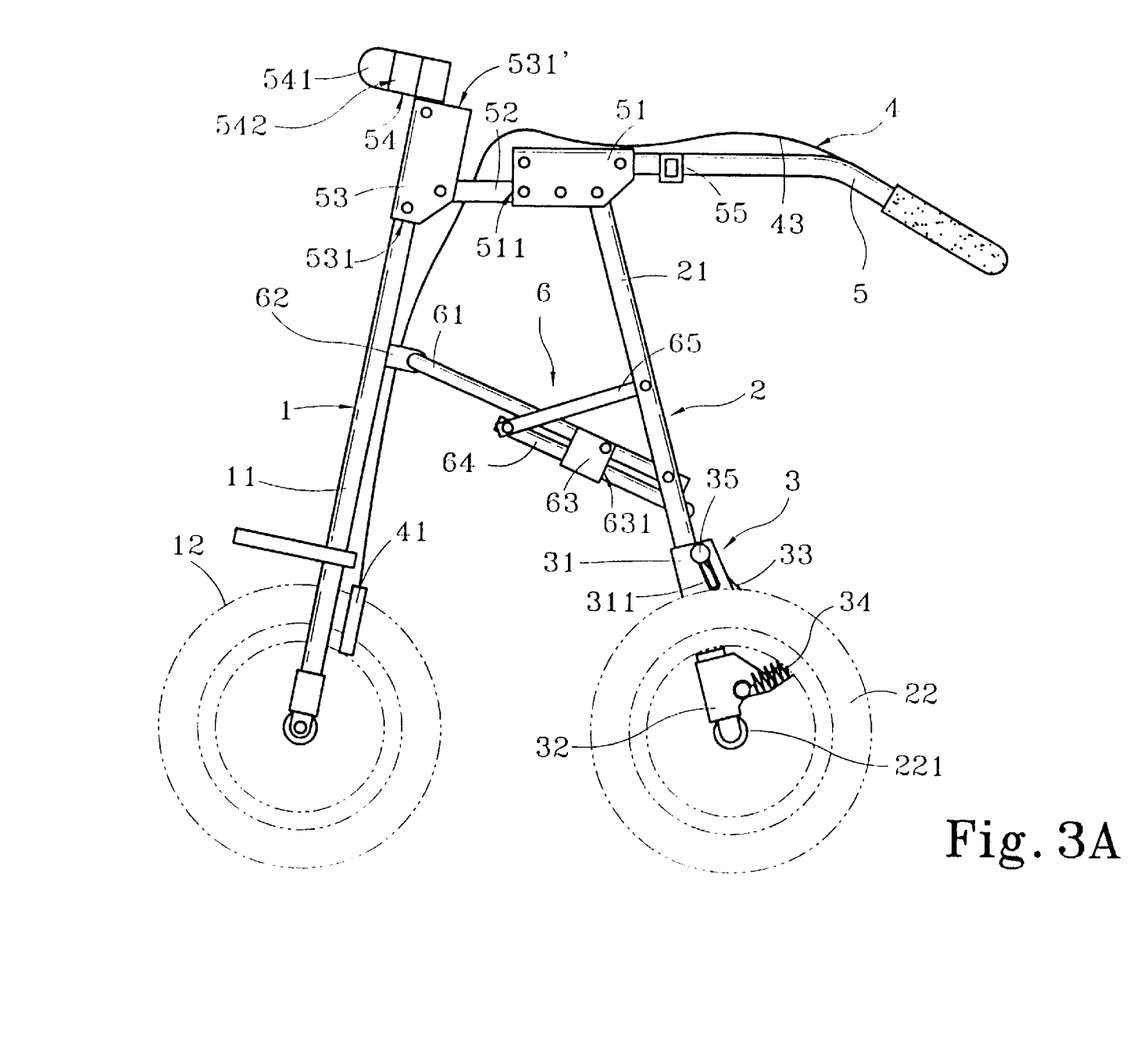
FIG. 3A shows the locking plates disengaged from the connecting tubes, the handlebar turned downs according to the present invention.
Figure 3B:
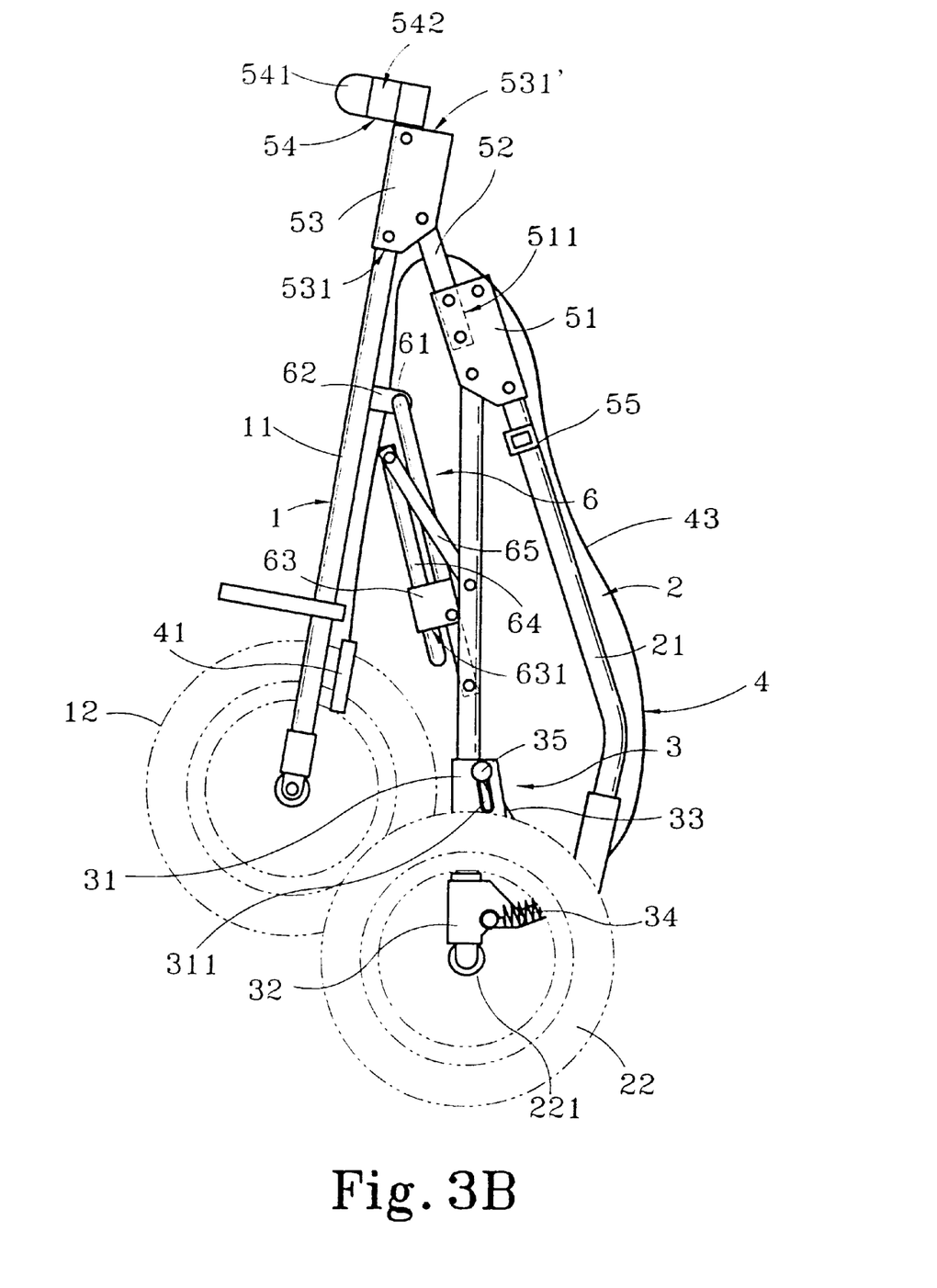
FIG. 3B shows the folding collapsible baby stroller collapsed.

Referring to FIG. 3B and FIGS. 1, 2 and 3A again, when turning the locking plate 541 of each of the locking devices 54 outwards from the corresponding connecting tube 52, the connecting tubes 52 are released from the constraint of the locking devices 54, allowing the handlebar 5 to be turned downwards relative to the front wheel frame 1 toward the rear wheel frame 2. When turning the handlebar 5 downwards toward the rear wheel frame 2, the connecting tubes 52 are respectively extended out of the positioning groove 542 at the locking plate 541 of each of the locking devices 54, the front bearing frame 61 is turned about the cross bar 62, and the rear bearing frame 64 is relative to the front bearing frame 61 toward the front wheel frame 1, thereby causing the rear wheel frame 2 to be moved toward the front wheel frame 1, and therefore the folding collapsible baby stroller is collapsed.

Figure 4:
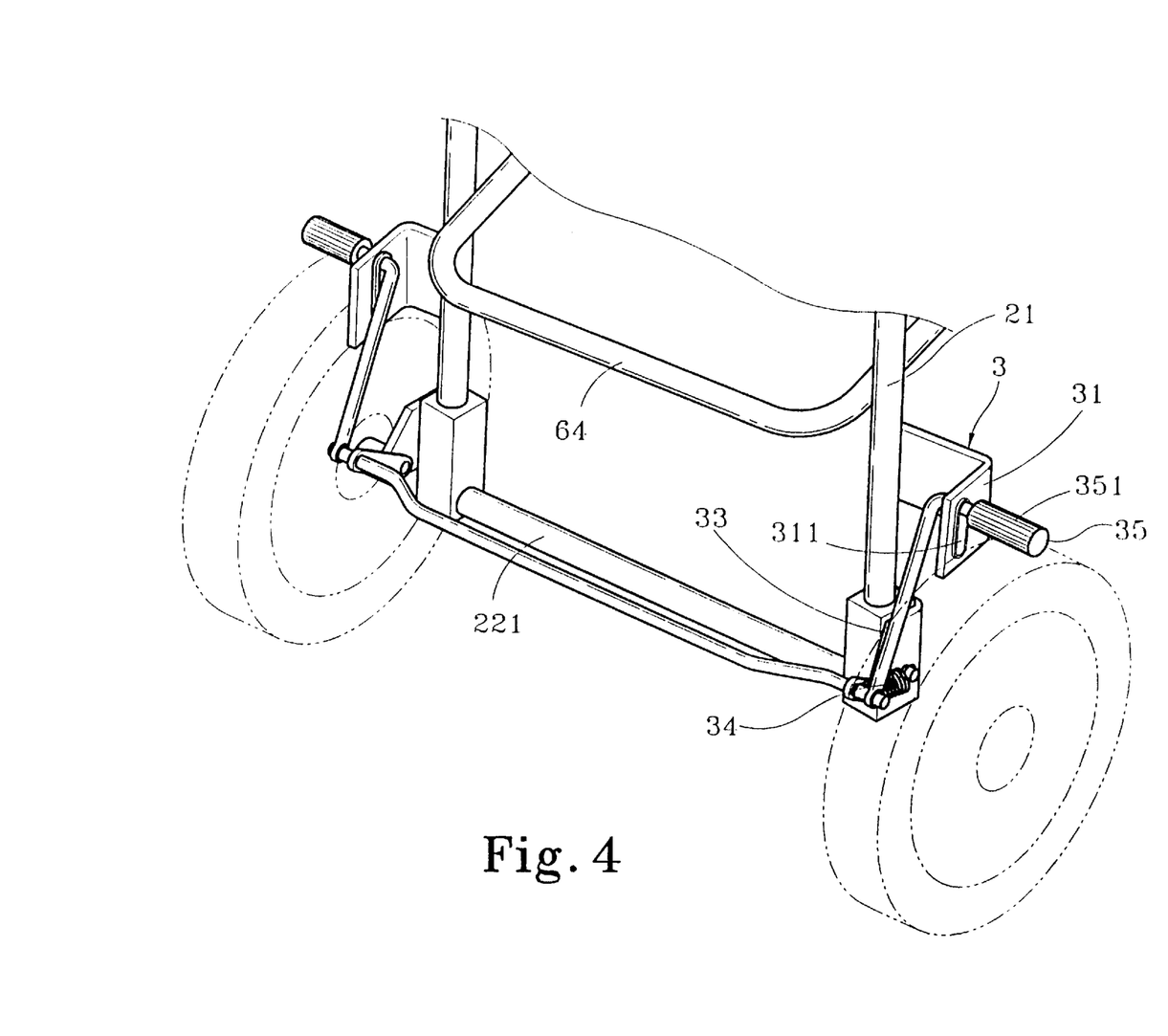
FIG. 4 is an enlarged view of a rear part of the folding collapsible baby stroller according to the present invention.
Figure 5A:
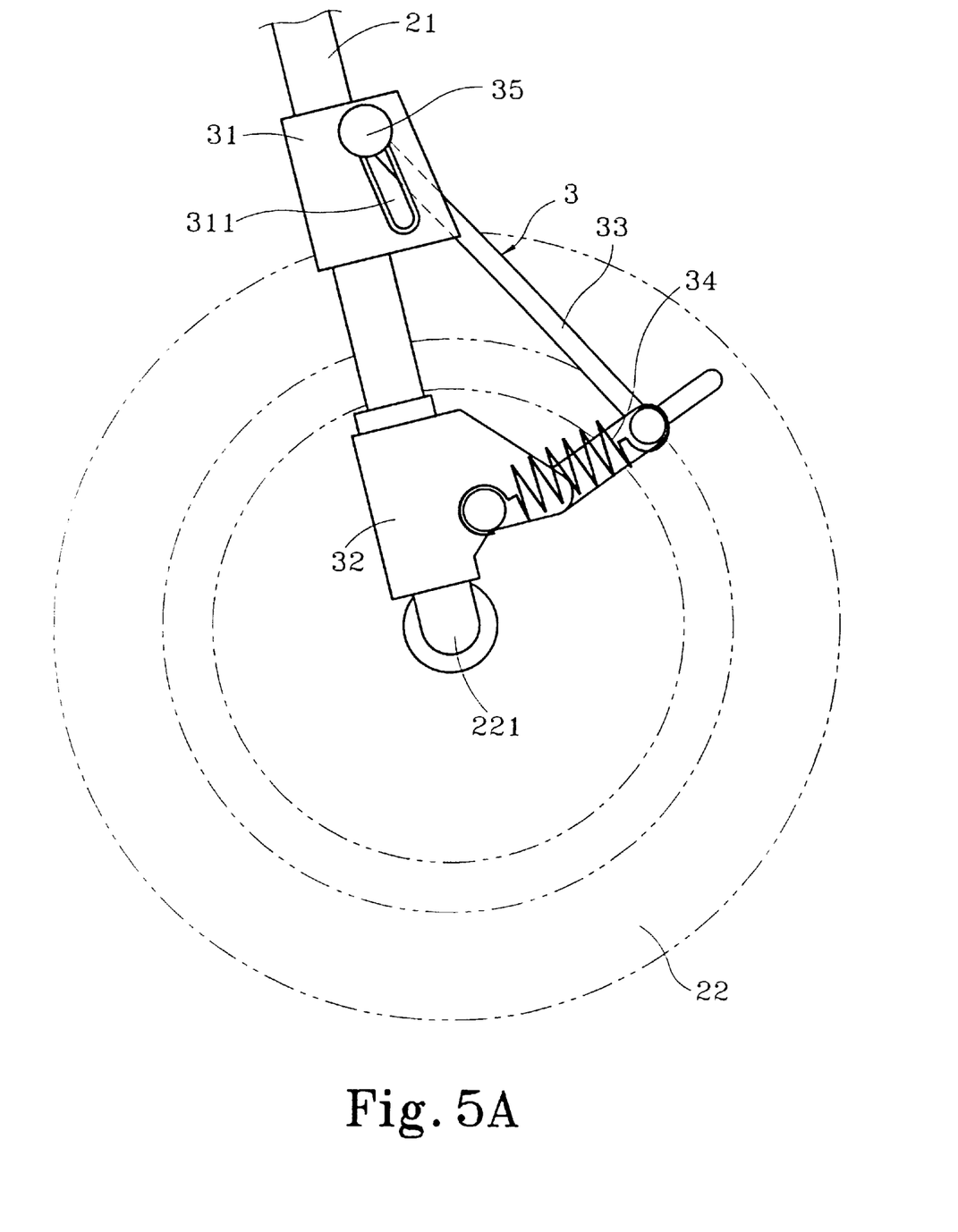
FIG. 5A is an enlarged view of a part of the present invention, showing the rear wheel brake maintained in the non-braking position.
Figure 5B:
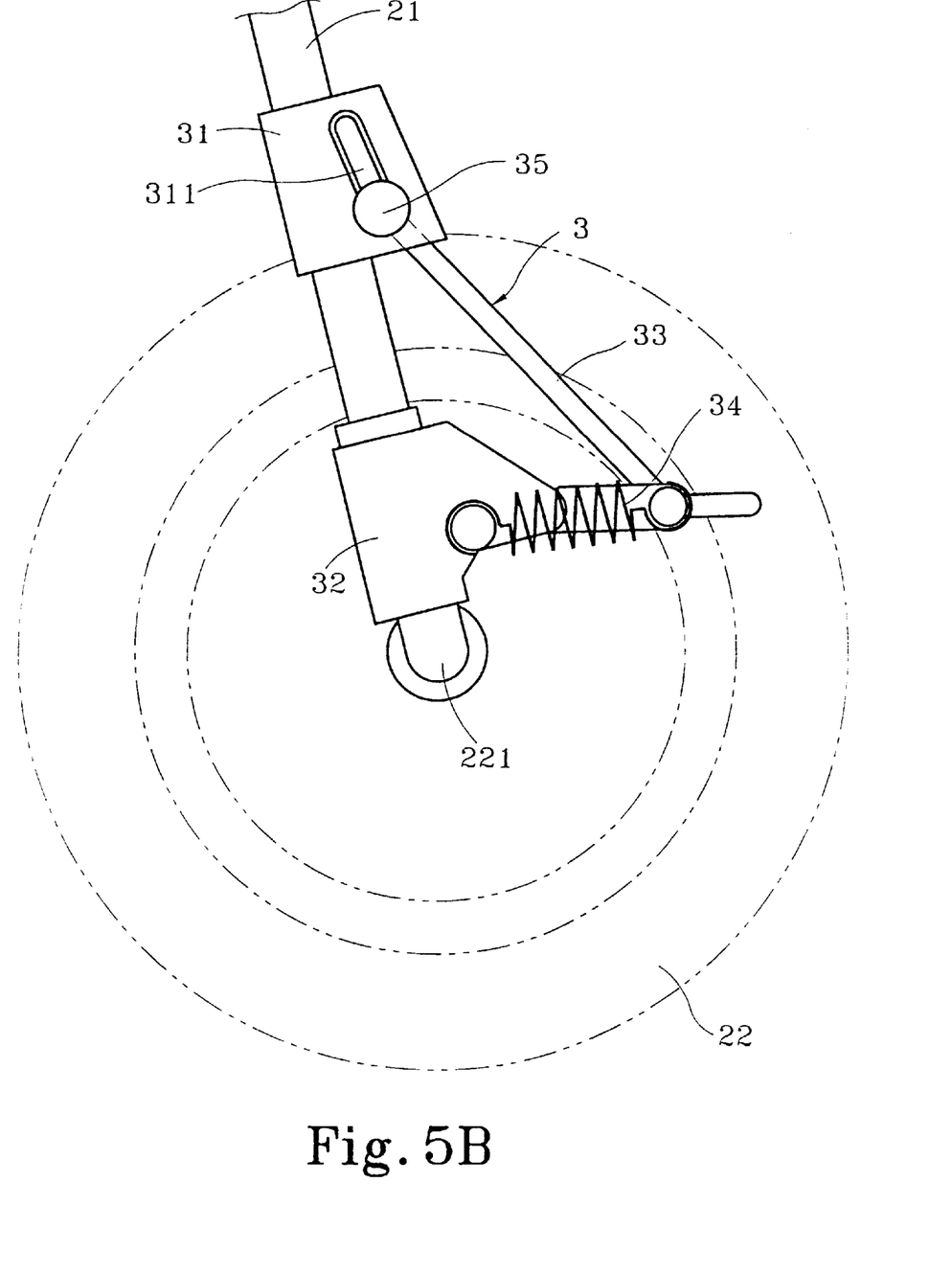
FIG. 5B is a similar to FIG. 5A but showing the rear wheel brake maintained in the braking position.
Figure 6:
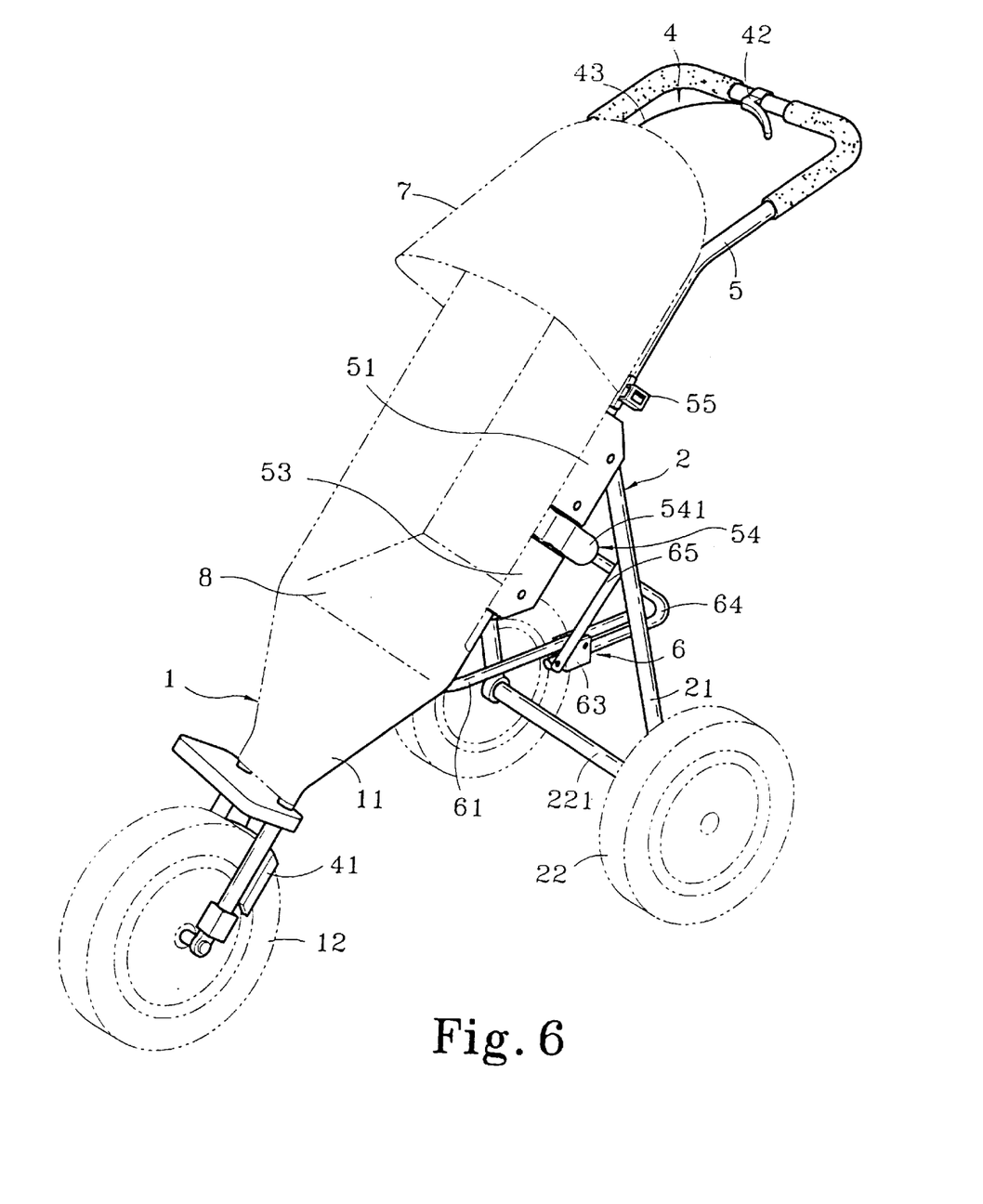
FIG. 6 illustrates a canopy and a seat installed in the handlebar and the seat frame according to the present invention.

Referring to FIGS. 4, 5A and 5B, and FIG. 1 again, the aforesaid rear wheel brake 3 comprises two angled lugs 31 respectively and fixedly fastened to the upright rod members 21 of the rear wheel frame 2 above the rear wheels 22, the angled lugs 31 each having an elongated slot 311, two locating plates 32 respectively connected to the rear axle 221 near the rear wheels 22, a brake lever 33 pivoted to the locating plates 32, the brake lever 33 having two opposite ends respectively inserted through the elongated slot 311 at each of the angled lugs 31, a constraint device 34 connected between the locating plates 32 and the brake lever 33, and two brake members 35 respectively mounted on the two opposite ends of the brake lever 33 and suspended above the rear wheels 22. The brake members 35 each have a toothed peripheral working face 351 for engagement with the tread of the corresponding rear wheel 22. The constraint device 34 can be, for example, spring means. Further, a front wheel brake 4 is provided for operation by hand to stop the front wheel 12. The front wheel brake 4 comprises a brake shoe assembly 41 mounted on the front wheel frame 1 around the front wheel 12, a brake actuator 42 mounted on the handlebar 5, and a brake cable 43 connected between the brake shoe assembly 41 and the brake actuator 42. When going down a slope, the brake actuator 42 is operated to pull up the brake cable 43, causing the brake shoe assembly 41 to be forced into close contact with the tread of the front wheel 12, and therefore the moving speed of the baby stroller is lowered down or stopped. Alternatively, the user can press down the brake lever 33 to pull down the brake members 35 against the tread of each of the rear wheels 22, causing the baby stroller to be stopped. Because of the constraint of the spring power of the constraint device 34, the brake members 35 are maintained in the braking position after the brake lever 33 has been pressed down. When disengaging the brake members 35 from the rear wheels 22, the brake lever 33 must be pulled up and returned to its former position.

What is claimed is:

1. A folding collapsible baby stroller comprising:
    a front wheel frame, said front wheel frame comprising two coupling frames bilaterally disposed at a top side, and a front wheel disposed at a bottom side;
    a rear wheel frame, said rear wheel frame comprising a rear wheel axle, and two rear wheels mounted on two distal ends of said rear wheel axle;
    a rear wheel brake mounted on said rear wheel frame and operated to lock said rear wheels, said rear wheel brake comprising two lugs respectively and fixedly fastened to said rear wheel frame at two opposite sides above said rear wheels, said lugs each having an elongated slot, two locating plates respectively connected to said rear axle near said rear wheels, a brake lever pivoted to said locating plates and turned between a braking position and a non-braking position, said brake lever having two opposite ends respectively inserted through the elongated slot at each of said lugs, a constraint device connected between said locating plates and said brake lever for holding said brake lever in said braking position, and two brake members respectively mounted on the two opposite ends of said brake lever and suspended above said rear wheels for stopping said rear wheels after said brake lever having been moved to said braking position;
    a substantially U-shaped handlebar pivoted to said front wheel frame and said rear wheel frame, said handlebar comprising two fixed coupling frames at two opposite ends thereof respectively pivoted to said rear wheel frame, and two fixed connecting tubes respectively pivoted to the coupling frames at said front wheel frame;
    a seat frame coupled between said front wheel frame and said rear wheel frame, said seat frame comprising a fixed cross bar fixedly connected to the rod members of said front wheel frame, a substantially U-shaped front bearing frame pivoted to said fixed cross bar, a substantially U-shaped rear bearing frame, two slides respectively coupled between two parallel ends of said U-shaped rear bearing frame and two parallel ends of said U-shaped front bearing frame, and two connecting rods coupled between the two parallel ends of said U-shaped rear bearing frame and the upright rod members of said rear wheel frame, said connecting rods each having one end pivoted to said rear wheel frame and an opposite end pivoted to said U-shaped rear bearing frame.

2. The folding collapsible baby stroller of claim 1 further comprising a front wheel brake for operation by hand to stop said front wheel, said front wheel brake comprising a brake shoe assembly mounted on said front wheel frame around said front wheel, a brake actuators mounted on said handlebar, and a brake cable connected between said brake shoe assembly and the brake actuates at said handlebar.

3. The folding collapsible baby stroller of claim 1 further comprising locking means for locking said handlebar, said locking means comprising two locking devices respectively fastened to said front wheel frame at two opposite sides corresponding to the connecting tubes at said handlebar, said locking devices each comprising a locking plate, said locking plate having a positioning groove for receiving the corresponding connecting tube.

4. The folding collapsible baby stroller of claim 1 wherein the coupling frames at said front wheel frame each comprise a longitudinally extended side groove; the connecting rods of said handlebar are respectively pivoted to the coupling frames at said front wheel frame, and turned in and out of the longitudinally extended side groove at each of the coupling frames at said front wheel frame.

5. The folding collapsible baby stroller of claim 1 wherein said handlebar comprises two lugs holding a canopy.

6. The folding collapsible baby stroller of claim 1 wherein said constraint device is spring means.

7. The folding collapsible baby stroller of claim 1 wherein said brake member has a toothed peripheral working face for engagement with a tread of each of said rear wheels.

* * * * *